(12) United States Patent
Kesper et al.

(10) Patent No.: US 6,254,841 B1
(45) Date of Patent: Jul. 3, 2001

(54) RECOMBINATION SYSTEM FOR THE CATALYTIC RECOMBINATION OF HYDROGEN AND OXYGEN, FORMING IN STORAGE BATTERIES, INTO WATER

(75) Inventors: Heinrich Kesper, Willingen; Norbert Lahme, Brilon; Ute Vielhaber, Bestwig, all of (DE)

(73) Assignee: Accumulatorenwerke Hoppecke Carl Zoellner & Sohn GmbH & Co. KG (DE)

( * ) Notice: Subject to any disclaimer, the term of this patent is extended or adjusted under 35 U.S.C. 154(b) by 0 days.

(21) Appl. No.: 09/294,685

(22) Filed: Apr. 19, 1999

(30) Foreign Application Priority Data

Apr. 20, 1998 (EP) .................................. 98107146

(51) Int. Cl.[7] ........................................ B01J 8/02
(52) U.S. Cl. .................... 422/211; 422/177; 429/57; 429/82; 429/86; 429/89
(58) Field of Search ................. 429/86, 89, 98, 429/82, 57; 422/211, 177, 24

(56) References Cited

U.S. PATENT DOCUMENTS

| | | |
|---|---|---|
| 2,615,062 * | 10/1952 | Craig . |
| 3,038,954 * | 6/1962 | Pattison et al. . |
| 3,832,238 * | 8/1974 | Marui et al. . |
| 3,944,437 | 3/1976 | Auerbach . |
| 4,002,496 | 1/1977 | Nitta et al. . |
| 4,048,387 | 9/1977 | Lahme et al. . |
| 4,378,413 * | 3/1983 | Winsel et al. .................... 429/86 |

FOREIGN PATENT DOCUMENTS

| | | |
|---|---|---|
| 20 08 218 | 2/1970 | (DE) . |
| 22 13 219 | 3/1972 | (DE) . |
| 22 37 950 | 8/1972 | (DE) . |
| 22 65 701 | 8/1972 | (DE) . |
| 30 18 372 | 11/1981 | (DE) . |
| 0 189 543 | 11/1985 | (EP) . |
| 56-141181 | 11/1981 | (JP) . |
| 60-154457 | 8/1985 | (JP) . |

* cited by examiner

*Primary Examiner*—Hien Tran
*Assistant Examiner*—Basia Ridley
(74) *Attorney, Agent, or Firm*—Cantor Colburn LLP

(57) ABSTRACT

For an improved recombination system serving to catalytically recombine hydrogen and oxygen, which form in a storage battery, into water and incorporating an adapter union assembly for the gas-tight connection of the system to a storage battery, a container which is gas-impermeable to the outside and which houses a recombination assembly, as well as a conduit for the loss-less gas intake from the adapter union to the container and water return flow in the opposite direction, whereby even in the event of an overload the hazard of escaping gas can be avoided and the efficacy of the catalytic unit can be maintained while at the same time the system can be produced at low cost and in a way as to be easily assembled and maintenance-free, this invention proposes to provide next to the conduit an expansion section which is open toward the outside but delimited by an ignition suppressor, and to connect the conduit with the expansion section by way of a gating aperture.

13 Claims, 2 Drawing Sheets

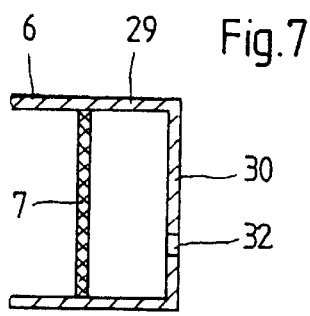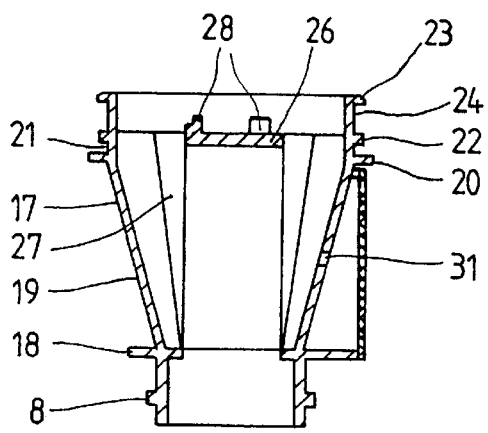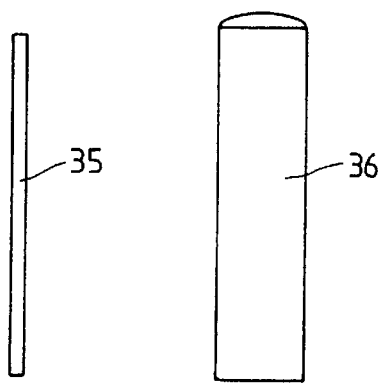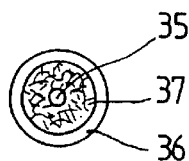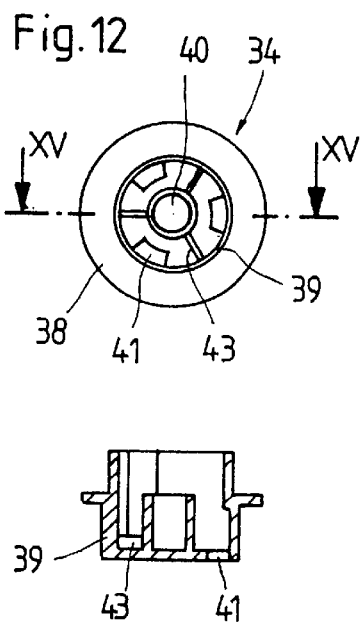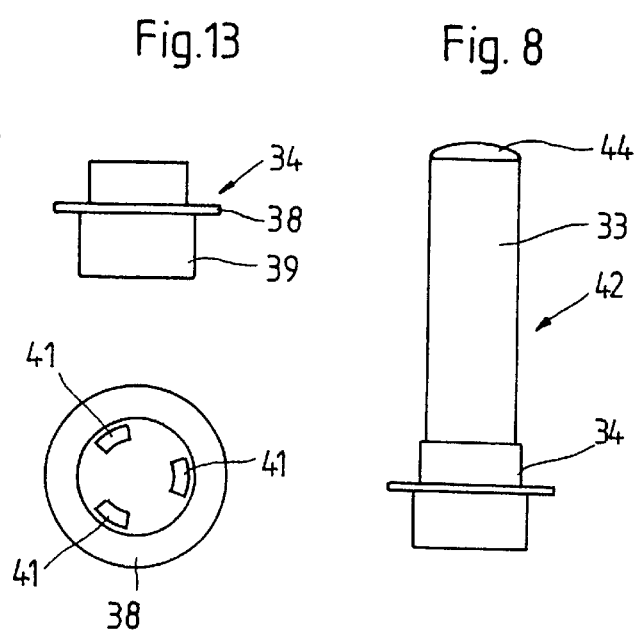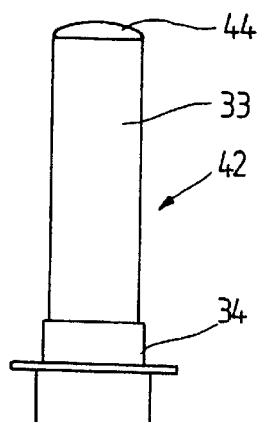

RECOMBINATION SYSTEM FOR THE CATALYTIC RECOMBINATION OF HYDROGEN AND OXYGEN, FORMING IN STORAGE BATTERIES, INTO WATER

TECHNICAL FIELD OF THE INVENTION

This invention relates to a recombination system for the catalytic recombination of hydrogen and oxygen, forming in storage batteries, into water.

BACKGROUND OF THE INVENTION

Recombination systems for electric accumulator or storage batteries have been pair of prior art for over 25 years. A system of that type is described in the DE-PS (German patent) 20088218. A corresponding catalyst is described in DE-PS 2213219, absorbers in DE 2237950 C3 and DE 2265701 C3.

To date, their basic design concept has remained essentially unchanged. The core feature of these recombiners is a catalyst-coated rod for instance of copper, alumina or the like. The catalysts most commonly used are platinum metals and especially palladium. The catalytic rod is centrally mounted in a tube of a porous material, for instance a gas-permeable ceramic tube; the remaining space in the tube is filled with absorption material. Absorbers employed include lead oxide, silver nitrate, iron oxide, cupric oxide and the like. The tube is enclosed in free-standing fashion in a gas-tight container preferably consisting of a synthetic material, and its ends are sealed. The container is provided with an adapter union by way of which it is connected to a storage battery for gas intake and water removal.

The hydrogen and oxygen gases which constitute an oxyhydrogen gas mixture and form during the operation of a battery are channeled into the container via the adapter union, pass by the porous tube and the absorbers and on contact with the catalyst are recombined into water. The reaction is exothennal so that the water precipitates in the form of water vapor on the container wall where it is condensed, and then flows back into the battery via the adapter.

In the publications mentioned, the container is in the form of a single unit directly incorporating the adapter, for example an injection-molded structure with an opening accepting, in gas-tight fashion, the catalytic unit described above. The oxyhydrogen gas cannot escape.

Prior art also includes configurations in which the connecting adapter and the container are produced separately and are assembled, by means of a retaining element, after the catalytic unit has been installed, whereupon they are locked together for instance by welding.

These earlier recombination systems have a number of drawbacks. While the individual elements, if plastic, are easy to make, their installation is complex and not automatable. In view of the exothermal reaction the entire, complex retaining element must consist of a high-quality, heat-resistant synthetic material. Separating the materials, as required nowadays, for disposal or even recycling of the individual components is possible at considerable cost only. In terms of its utilization, the size of the container is limited and the dimensions of the catalytic unit are tailored to a gas volume that is to be expected under normal operating conditions. However, in the event the gas volume is larger due to an overload, a higher charging current or the like, the container will fill up with water vapor, producing an internal pressure that prevents the intake of additional gas. Proper function of the unit is no longer assured. Yet any uncontrolled escape of oxyhydrogen gas must be avoided. It has also been found that any overload will substantially reduce the effectiveness of the catalytic unit since the oxyhydrogen gas entering the container no longer reaches the surface of the catalyst in reliable and controllable fashion.

Simply exhausting oxyhydrogen gas to the outside would pose an ignition hazard whereby the flame might propagate all the way into the battery.

Apart from the cost-related drawbacks in terms of production, assembly and disposal or recycling, the prime concern is inadequate safety in the event of an overload. Recombination systems are predominantly employed in conjunction with stand-by storage batteries, emergency-power units and the like and should ensure dependable operation, with a minimum of maintenance even over extended periods of time.

SUMMARY OF THE INVENTION

In light of the prior art referred to above, this invention is aimed at providing a recombination unit of the type described incorporating improvements which will prevent the hazards posed by escaping gas even under overload conditions. In addition, it is designed to prevent a deterioration of the efficacy of the catalytic unit in the event of an overload. As a whole, the intent is to allow for low-cost production, easy installation and maintenance-free operation of the system.

The technical solution proposed by the invention involves a recombination system incorporating an adapter union for the gas-tight connection of the system to a storage battery, a container that is gas-impermeable to the outside and houses a recombination assembly, and a conduit for the gas-tight intake of gas through the adapter into the container and for the water return flow in the opposite direction, with an expansion section provided next to the conduit which section is open toward but separated from the outside by an ignition suppressor, while the conduit connects to the expansion section by way of a gating aperture.

In the design according to this invention, gas will flow from the battery through the conduit and into the container in the process of which it is possible, if necessary, for gas to escape via the gating aperture into the expansion section situated next to the conduit and, if dictated by circumstances, to be exhausted through the ignition suppressor to the outside. The expansion section is preferably a short pipe extending laterally from the conduit. The conduit itself may be a tubular element, preferably funnel-shaped to facilitate water collection, attached to whose wall, at an essentially perpendicular angle relative to it, is a short pipe section. A suitable, recommended ignition suppressor is a sintered frit, for instance a frit of sintered polypropylene or polyethylene. The gating aperture is a bore in the wall of the conduit having a diameter substantially smaller than that of the conduit or that of the expansion section. In other words, the gating aperture is very small, for instance with a diameter of I mm whereas the diameter of the conduit or of the expansion section may be about 2 to 4 cm. Thus, under normal operating conditions, no gas will escape to the outside. If, however, an overload condition forces gas to the outside, the frit will prevent any break-through explosion. The ignition suppressor according to this invention constitutes a substantial improvement of the recombination system in terms of its safety aspects.

This invention offers another safety-related improvement addressing the possibility of ignition. Traditionally, a gas exhaust system is dimensioned in adaptation to a gas volume which in storage batteries is expected to be a function of capacity or of the charging current, so that in the event of an ignition the gases which have passed through the frit will burn off quickly. But if a larger volume of gas is generated, the flame will be continuously fueled. The flame will destroy the frit in short order, eliminating the ignition suppressor with well-known consequences, i.e. backfiring. For example, when a storage battery is designed for a charging current of 20A, the gas exhaust system will be designed to handle the gas volume to be expected. In terms of electronic capacity, modern storage batteries can easily be used or modified for operations involving or requiring higher charging currents. When higher charging currents are applied, or whenever a battery of essentially unchanged dimensions is to be designed for higher charging currents, the resulting gas volume will be substantially augmented and for the reasons stated the ignition suppressor can no longer be considered dependable. But the recombination unit should be protected against backfiring even under substantially greater than rated, expected gas volume conditions. This should be attainable without any basic design and size changes. According to another aspect of this invention, it is therefore proposed to provide a gas exhaust channel, behind the ignition suppressor in the direction of the gas flow, with at least one gas escape opening which in terms of the gas flow cross section is substantially smaller than the diameter of the gas exhaust channel. In a surprising discovery, it has been found that with the design according to this invention, even in the presence of strong gas pressure into the gas exhaust system and an explosion into the area between the ignition suppressor and the outside, the gas intake is attenuated at least to the point where, upon ignition, the flame does not remain fueled and is extinguished, preventing the ignition suppressor from destruction. This appears to be attributable to the formation of a pressure chamber by virtue of the substantially smaller gas flow cross section relative to the gas exhaust channel located behind the ignition suppressor in the flow direction and provided with at least one gas escape opening, as a result of which the pressure generated by an explosive gas ignition will at least briefly stop any further gas flow and fueling of the flame. In a desirable and recommended design, the gas escape opening is in the form of a bore in an end wall of the gas exhaust channel. Thus, according to this invention, the expansion section is extended behind the frit in the direction of the gas flow and is closed off from the environment except for a very small opening. In one desirable embodiment of this invention, the gas exhaust channel is configured as a chamber. This chamber is preferably delimited on one side by the ignition suppressor and on the opposite side by a wall which extends essentially perpendicular to the direction of the gas flow and is provided with the gas escape opening. The term chamber refers to a gas exhaust channel which is quite short compared to its cross section, thus forming a chamber. The functional aspect of significance is the presence of a pressure chamber between the frit and the outside by means of a separating wall with a sufficiently small opening. In traditional fashion the size of the opening must be such as to permit unobstructed passage of the gas yet small enough to permit the build-up of the necessary pressure in the event of an ignition. To provide a rough idea for reference purposes, the ratio between the gas-flow cross section in the gas exhaust channel and the gas escape opening should be around 100:1.

To reduce the cost of the recombination system in terms of its production, assembly, disposal or recycling it is recommended that it be modular in design and that at least an adapter union assembly with a carrier on the container side, a recombination assembly with a support base and a container make up the individual modules. In one implementation of this invention, the adapter assembly encompasses the union, the conduit which at its container end incorporates a fin-mounted carrier unit, the expansion section and the ignition suppressor. The gating aperture, of course, is preformed.

Optionally, the pressure chamber may also be incorporated, but it may equally well be a separate module. The adapter assembly is provided at one end with a union for connecting it to an opening in a storage battery which, depending on operating requirements, may be provided with fasteners, a thread, lugs for a bayonet coupling and a recess for a seal or gasket such as an O-ring. This assembly connects to a preferably funnel-shaped conduit with a lateral expansion section in the form of a short stub pipe, terminating in a frit, with a small opening provided in the appropriate wall between the conduit and the expansion section. The other end is designed for attaching the container. It is important for implementing this invention that the container be provided with a groove for an O-ring and, on its lower edge, with a detent accepting a corresponding locking lug or vice versa. Other suitable connecting elements may also be used. The conduit is preferably equipped with a carrier in the form of a round disk, centrally held in place by fins that extend from the wall, and permitting the gas to flow past its edges. Since the adapter assembly does not connect directly to the catalytic unit, it may by produced as a single injection-molded unit with the obvious exclusion of the frit.

As another desirable feature according to this invention, the recombination element incorporates a support base which can be connected to the carrier unit of the adapter assembly and from the center of which extends a preferably palladium-coated catalyzing rod, concentrically surrounded by a tube that is made of a porous material, capped at the free end and filled with absorption material. The tube and the absorbers are of the conventional type. The free end of the tube is preferably sealed off with water glass. The support base consists of a heat-resistant thermoplastic material. On one side it is cup-shaped with two concentric rims. The inner rim accepts the catalytic rod, the outer rim accepts the tube. The bottom is provided with interlocking slots designed to accept the lugs of the carrier disk of the adapter assembly so that the preassembled catalytic unit can be easily mounted on and interlocked with the adapter assembly. The various other components can be attached by ultrasonic fusion.

The container is preferably more or less cylindrical, closed at one end while the open end is designed to mount on the adapter union in gas-tight fashion employing an O-ring. It will be desirable to provide the open end of the container with axial indentations, allowing corresponding protrusions on the adapter assembly to engage in these to serve as locking lugs preventing any rotation of the container. Inward-pointing tabs on the lower edge of the container engage in an interlocking groove on the outer perimeter of the adapter element. According to this invention, a ring can be slipped over the lower container rim, securing the container against axial misalignment as well.

As a particularly desirable feature, a flat flow baffle is positioned in the area of the gas intake of the container, i.e. at the point of transition between the conduit and the container, essentially crosswise relative to, and in a way as to narrow the cross section of, the gas flow at the intake. This serves as a simple overload protection device which controls the gas flow to the catalytic assembly and ensures a high degree of efficacy even when charging currents are high. This baffle is preferably in the form of an annular element attached to the support base. The annular baffle is positioned in the central region of the flow path from the conduit to the container, forcing the incoming gas to flow around it and then hug the surface of the catalytic element located downstream from the baffle without being impeded by the water vapor atmosphere.

This invention provides for an enhanced recombination system by simple means, effectively and economically. An aperture in the conduit serves to vent off excess gas, a frit behind it serves as an ignition suppressor. A pressure chamber that may be incorporated can prevent backfiring. A modular design makes the system cost-effective in terms of its manufacture, assembly, maintenance as well as the disposal or recycling of individual components. An additional flow baffle provides effective overload protection. Each individual measure is innovative and an invention unto itself, advantageously employable even independent of the other features.

BRIEF DESCRIPTION OF THE DRAWINGS:

Other advantages and features will become evident from the following description and the drawings in which:

FIG. 6 is a cross-sectional view along the line IV—IV in FIG. 5;

FIG. 7 is a cross-sectional detail view of another design example of an adapter assembly;

FIG. 8 shows a catalytic assembly;

FIG. 9 shows a catalytic rod;

FIG. 10 shows a porous tube;

FIG. 11 is a top view of a catalytic module;

FIG. 12 is a top view of a support base;

FIG. 13 is a lateral view of the support base per FIG. 12;

FIG. 14 is a plantar view of the support base per FIG. 12; and

FIG. 15 is a cross-sectional view of the support base per FIG. 12.

DESCRIPTION OF THE PREFERRED EMBODIMENT

Figure 1:
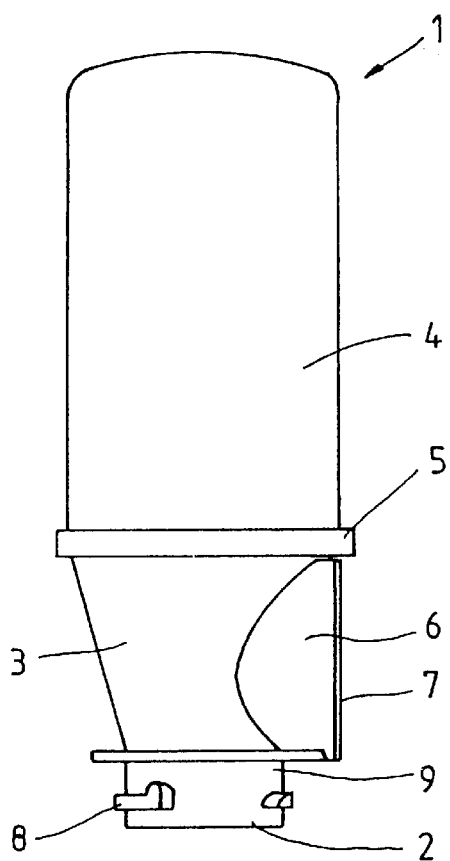
FIG. 1 shows one design example of a recombination system.

In these figures, identical reference numbers signify identical components. FIG. 1 is a general view of a design example of a recombination system 1 according to this invention, with an adapter union 2, an adapter assembly 3, a container 4, a locking ring 5 and a expansion section 6 which is closed off by a frit 7. The union 2 is provided with cams 8 for locking the device bayonet-style on the cell opening of a storage battery, not shown. The area 9 remaining above the lugs 8 serves to accept an O-ring gasket, not shown.

Figure 2:
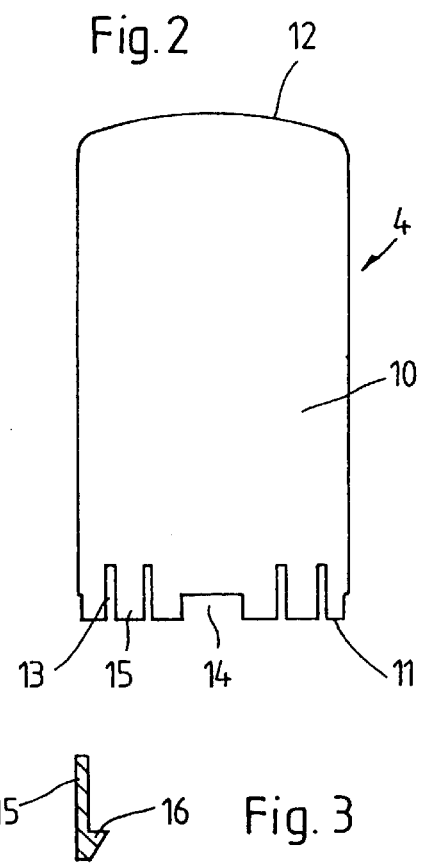
FIG. 2 illustrates a container.
Figure 3:
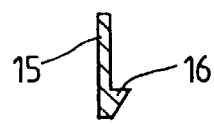
FIG. 3 shows in detail an interlocking lug on the container side.
Figure 4:
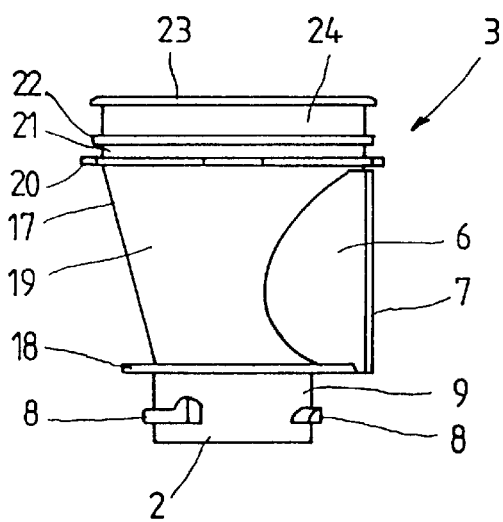
FIG. 4 shows an adapter assembly.
Figure 5:
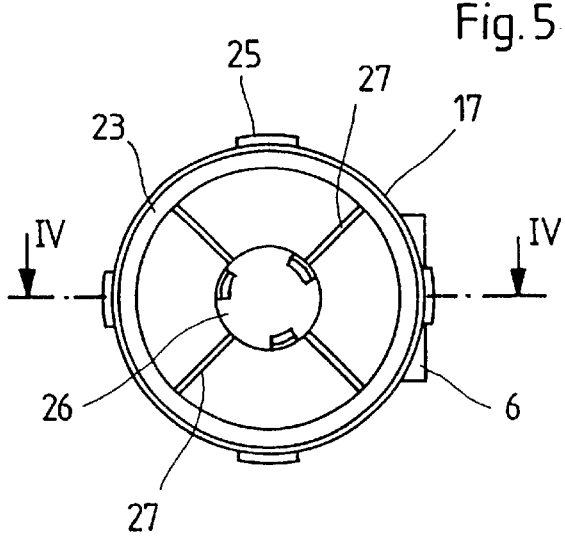
FIG. 5 is a top view of the adapter assembly per FIG. 4.

FIGS. 2 and 3 illustrate details of the container 4. The latter consists essentially of a thin-walled plastic cylinder 10 with an open end 11 and a closed end 12. The open end 11 is provided with vertically extending indentations 13, forming tabs 15 between them. This makes the open end 11 of the container 4 resilient, allowing it to be snapped onto a corresponding rim, for instance with the interpositioning of an O-ring gasket, not shown. As is shown in FIG. 3, individual tabs 15 are provided with catches 16 serving to snap into a locking position around a circular perimeter. The open end 11 also has recesses 14 in which engage corresponding lugs to prevent rotation.

FIGS. 4 to 7 show details of the adapter assembly 3 of the design example described. This plastic unit which, except for the frit 7, is molded in one piece, encompasses the plastic adapter 17. The frit 7 consists of sintered polypropylene or polyethylene and is cemented, fused or otherwise attached to the adapter assembly 3. At its lower end the adapter unit 17 is provided with the union 2 with its bayonet lugs 8 and the gasket area 9. Extending from there is a support flange 18 which serves as the footing when the system is mounted on a storage battery. Located above that is the conduit 19 with its lateral expansion section 6. Situated above the conduit 19 is a locking ring 20 with locking lugs 25 which engage in the recesses 14 of the container when the system is assembled. Above that are the clamping groove 21 and the clamping ring 22. The catches 16 of the locking tabs 15 on the container 4 snap over the clamping ring 22 and engage in the clamping groove 21. Located above that are the gasket groove 24 and the sealing flange 23. The gasket groove serves to accept a gasket, for instance a so-called O-ring. In that fashion, the container permits simple, gas-tight, rotationally fixed snap-on connection with the adapter assembly. The locking ring 5, shown in FIG. 1, can then be slipped over the system from the top, holding the catches 16 of the tabs 15 securely in the clamping groove and preventing any tilting of the container.

The fins 27 inside the conduit 19 support the carrier disk 26. The gas flows between the fins and around the carrier disk. The carrier disk 26 incorporates locking cams 28, in the design example shown three such cams spaced 120 degrees apart. The aperture 31 provided in the wall of the conduit 19 connects the conduit 19 with the adjoining expansion section. This aperture is very small, just large enough to allow excess gas to escape when the pressure is correspondingly high. FIG. 7 shows this unique configuration, whereby the expansion section 6, delimited by the frit 7, is followed by a gas exhaust channel 29 which is closed off by the wall 30 that contains the small gas escape opening 32. In the design example shown, the additional space is an integral part, but the gas exhaust channel with its wall and the opening therein may equally well be produced as a separate module.

FIGS. 8 to 15 illustrate details of the catalytic assembly 42 which encompasses the catalytic unit 33 and the support base 34. In FIGS. 9 to 11, the catalytic unit consists of the catalytic rod 35 which is concentrically surrounded by the porous tube 36, with the absorption material 37 placed in between. The assembly is mounted on a support base 34 which is shown in detail in FIGS. 12 to 15. The base is a thermoplastic part in the form of a heat-resistant synthetic material in view of its direct contact with the catalyst and of the exothermal recombination process.

The support base encompasses an outer cup 39 and an inner cup 40. The inner cup 40 accepts the catalytic rod 35, the outer cup 39 accepts the porous tube 36. The tube is supported by the fins 43. Its free end 44 may be sealed off for instance with water glass as indicated in FIG. 8. The bottom of the cup is provided with slots 41 into which lock the cams 28 of the carrier disk when the unit is assembled. An annular flange 38 installed on the outer wall of the cup serves as a concentric flow baffle.

The design examples have been described for explanatory purposes only and the invention is not limited to them. In particular, the design of the modular components, i.e. the adapter, container and catalytic assemblies may vary.

What is claimed is:

1. A recombination system for the catalytic recombination of hydrogen and oxygen which form in storage batteries, into water, comprising:

an adapter union for gas-tight connection of the system to a storage battery;

a container housing a recombination assembly, the recombination assembly comprising a recombination catalyst;

a conduit for the gas tight intake of gas from the adapter union to the container and for water return flow in the opposite direction; and an expansion section, provided adjacent to the conduit, the expansion section being connected with the conduit via a gating aperture, and being separated from the outside by an ignition suppressor which is gas-permeable but prevents sparks from entering the expansion section.

2. The recombination system as set forth in claim 1, wherein the expansion section is a short pipe section extending laterally from the conduit.

3. The recombination system as set forth in claim 1, wherein the ignition suppressor is a frit made from a sintered material.

4. The recombination system as set forth in claim 1, wherein the gating aperture is a bore in the wall of the conduit the diameter of which is substantially smaller than that of the conduit and that of the expansion section.

5. The recombination system as set forth in claim 1, further comprising a gas exhaust channel provided behind the ignition suppressor in the direction of the gas flow, the gas exhaust channel having at least one gas escape opening which has a flow cross-section substantially smaller than that of the gas exchaust channel.

6. The recombination system as set forth in claim 1, wherein the system is modular in design, whereby the individual modules comprise at least one adapter assembly with a carrier unit on container side, the recombination assembly further comprises a support base, and the container.

7. The recombination system as set forth in claim 6, wherein the adapter assembly includes the connecting adapter union, the conduit, the carrier unit supported by fins extending from walls within the conduit, the expansion section and the ignition suppressor.

8. The recombination system as set forth in claim 6, wherein the support base which permits connection to the carrier unit of the adapter assembly and which supports a centered, isolated, palladium-coated catalytic rod, the rod being concentrically surrounded by a tube which is capped at its free end and is filled with an absorption material.

9. The recombination system as set forth in claim 6, wherein the support base is ultrasonically fused to the carrier unit.

10. The recombination system as set forth in claim 1, wherein the container is essentially cylindrical and is closed at one end while its other, open end, is configured to permit gas-tight connection, with an O-ring gasket, to the adapter assembly.

11. The recombination system as set forth in claim 10, wherein the open end of the container is provided with axially extending indentations.

12. The recombination system as set forth in claim 1, further comprising a flat flow baffle provided within cross-sectional range of the conduit, the flat flow baffle extending in essentially transversal fashion relative to gas flow, narrowing the cross section of the conduit.

13. The recombination system as set forth in claim 12, wherein the flow baffle is an annular flange positioned on a support base of the recombination assembly.

* * * * *

UNITED STATES PATENT AND TRADEMARK OFFICE
CERTIFICATE OF CORRECTION

PATENT NO.    : 6,254,841 B1
DATED         : July 3, 2001
INVENTOR(S)   : Kesper et al.

It is certified that error appears in the above-identified patent and that said Letters Patent is hereby corrected as shown below:

Column 2,
Line 58, before "whereas", delete "I mm" and insert therefor -- 1 mm --.

Column 7,
Line 6, after "system for", delete "the";
Line 14, after "conduit for", delete "the";
Line 35, after "suppressor in", delete "the"; and
Line 35, after "direction of", delete "the".

Column 8
Line 5, after "further", delete "comprises" and insert therefor -- comprising --.

Signed and Sealed this

Twenty-fifth Day of October, 2005

JON W. DUDAS
*Director of the United States Patent and Trademark Office*